United States Patent
Rothenberger et al.

(10) Patent No.: US 6,287,108 B1
(45) Date of Patent: Sep. 11, 2001

(54) CONTROL OF THE BURNER HEAT OUTPUT IN A GAS-OPERATED COOKING OR BAKING APPLIANCE

(75) Inventors: Gerhard Rothenberger, Gaggenau; Dieter Weiss, Bühl, both of (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 09/443,554

(22) Filed: Nov. 18, 1999

(30) Foreign Application Priority Data

Nov. 18, 1998 (DE) ................................................ 198 53 262

(51) Int. Cl.⁷ ...................................................... F24C 3/12
(52) U.S. Cl. ............................ 431/12; 431/89; 126/39 BA
(58) Field of Search ........................... 126/39 E, 39 G, 126/39 BA; 431/89, 12; 137/486, 487.5; 73/204.25, 861.77, 861.79, 861.63, 861.65

(56) References Cited

U.S. PATENT DOCUMENTS

| 2,442,145 | * | 5/1948 | Ray ....................................... 137/487.5 |
| 3,862,644 | * | 1/1975 | Emmons et al. ........................ 137/486 |
| 4,457,291 | * | 7/1984 | Henke .................................... 126/39 G |
| 4,930,488 | * | 6/1990 | Pearman et al. ....................... 126/39 E |
| 5,146,941 | * | 9/1992 | Statler ................................... 137/486 |
| 5,241,463 | * | 8/1993 | Lee ........................................ 126/39 E |
| 5,924,857 | * | 7/1999 | Frasnetti et al. ...................... 126/39 BA |

FOREIGN PATENT DOCUMENTS

| 196 27 539 A1 | 1/1998 | (DE) . |
| 0 562 538 A2 | 9/1993 | (EP) . |

* cited by examiner

*Primary Examiner*—Sara Clarke
(74) *Attorney, Agent, or Firm*—Herbert L. Lerner; Laurence A. Greenberg; Werner H. Stemer

(57) ABSTRACT

The method allows accurate setting of the volumetric gas flow through a gas feed line to a burner nozzle of a gas-operated cooking or baking appliance and required for a desired burner heat output. A corresponding cooking or baking appliance, in particular a gas stove, gas cooker, a gas hob, or gas oven, has a burner with a nozzle connected to the gas feed line. A gas valve is arranged in the gas feed line. The accuracy and reproducibility of the setting of the volumetric gas flow is improved owing to the fact that a current flow (actual measured value) of the gas through the gas feed line is detected by means of a meter and is regulated to a calculated or preset desired flow value that corresponds to the desired burner heat output by means of a controller and an actuating device for varying the gas flow.

17 Claims, 3 Drawing Sheets

CONTROL OF THE BURNER HEAT OUTPUT IN A GAS-OPERATED COOKING OR BAKING APPLIANCE

BACKGROUND OF THE INVENTION

Field of the Invention

The invention relates to a method of setting the volumetric gas flow fed through a gas feed line to a burner nozzle of a gas-operated cooking or baking appliance and required for a desired burner heat output or heating power. The invention also relates to a corresponding cooking or baking appliance, in particular a gas cooker, a gas stove or gas oven, having a burner, the nozzle of which is connected to a gas feed line, and a gas valve arranged in the gas feed line.

Conventional gas-operated cooking or baking appliances, for example gas stoves, gas cookers, gas hobs, gas ovens, have one or more burners, in which gas is mixed with air and burned. City gas or natural gas, liquid gases (butane, propane) or gasified liquids (e.g. benzine, spirit) may serve as fuel. The gas types differ in their combustion behavior and their calorific value. The respectively used gas is extracted from a supply device, e.g. a gas supply network, a gas cylinder, a gas tank or reservoir, and fed to a burner via a gas feed line.

The feeding pressure of the gas relative to the atmosphere may vary depending on the gas system used (i.e. on the type of supply device and the type of gas used). But the gas pressure may also drop or increase by several mbar within a system.

The burner has a burner nozzle, which during operation of the burner constitutes the decisive flow resistance limiting the outflowing gas flow. The burner nozzle thus determines the maximum volumetric gas flow, i.e. the maximum heat output or heating power of the burner.

In the prior art, a proportional gas valve that is manually or electromotively actuated is used to set the desired burner heat output. The setpoint input to change the valve position is effected by means of a selector element, for example by turning an adjusting knob or by selection on a control panel. By partial opening or closing of the gas valve, the gas flow through the gas feed line (i.e. the volumetric gas flow through the line cross section per unit of time) is changed and thus the desired burner heat output is set.

A problem with such a gas valve is that it exhibits hysteresis in the setting behavior, i.e. the gas flow at the same valve position varies as a function of the length of the preceding adjusting travel and the direction in which the valve is actuated (i.e. opened or closed) for setting the desired gas flow. In addition, the control behavior of the gas valve may partly change to a considerable extent, depending on which gas type is used or on which burner type is connected to the gas feed line. The burner types differ, for example, in their maximum heat output, in their nozzle configuration, etc. For this reason, the burner nozzle and other parts must generally be exchanged if the cooking or baking appliance is to be operated with another gas type and/or another burner type.

On account of the hysteresis of the gas valve and gas-pressure fluctuations on the part of the gas-supply device, the reproducibility and setting accuracy of the volumetric gas flow is very slight if a user of the cooking or baking appliance is guided by a scale, assigned to the valve, of the selector element when setting the desired burner heat output. No accurately defined burner heat outputs can be selected by means of the scale. For this reason, the user generally pays only fleeting attention to the position of the selector element or to the scale. The user changes the position of the valve until the desired burner heat output is reached, in the course of which the user is in essence guided by the flame size and/or the cooking or baking behavior of the respective food.

German published patent application DE 196 27 539 A1 discloses a method and a configuration that sets the gas flow to a burner nozzle in steps. To this end, a plurality of choke elements are arranged in series or in parallel in the gas feed line. Binary switching elements are provided in order to switch the function of the respective choke elements on and off. The binary switching elements can switch the gas flow on and off by the choke element. A stepped reduction of the gas flow is carried out by the appropriate combination of certain switching elements in on or off position.

European published patent application EP 0 562 538 A2 describes a method and a corresponding appliance for setting and keeping constant a volumetric gas flow corresponding to a desired burner heat output. There, the pressure of the gas fed to a burner nozzle is measured by means of a pressure sensor and is brought to a predetermined value or is kept at the predetermined value by means of a control loop.

SUMMARY OF THE INVENTION

It is accordingly an object of the invention to provide a method and apparatus for burner power control in a gas appliance, which overcomes the above-mentioned disadvantages of the heretofore-known devices and methods of this general type. Specifically, it is an object of the present invention to provide a method of setting the volumetric gas flow fed through a gas feed line to a burner nozzle of a gas-operated cooking or baking appliance and required for a desired burner heat output and to provide a corresponding cooking or baking appliance, with which method or with which appliance the desired burner heat output can be reproduced to a high degree and can be set with high accuracy. According to further aspects, it is desirable that the method and the gas appliance work reliably and be realizable in a technically uncomplicated manner.

With the foregoing and other objects in view there is provided, in accordance with the invention, a method of setting a volumetric gas flow of a gas flowing through a gas feed line to a burner nozzle of a gas-operated cooking or baking appliance, which comprises:

measuring, with a meter, a current flow of a gas through a gas feed line to a burner nozzle; and regulating, with a controller and an actuating device, the gas flow to a calculated or preset setpoint flow value and thereby adjusting a burner heat output to a desired burner heat output.

In other words, the objects of the invention are satisfied with the method of setting the volumetric gas flow fed through a gas feed line to a burner nozzle of a gas-operated cooking or baking appliance and required for a desired burner heat output, wherein the current flow (actual measured value) of the gas through the gas feed line is detected by means of a meter and is regulated to a calculated or preset desired flow value corresponding to the desired burner heat output by means of a controller and an actuating device varying the gas flow.

In the flow control according to the invention, gas-pressure fluctuations in the gas feed line and valve-hysteresis phenomena are detected and compensated for. Thus, when presetting a desired burner heat output, the requisite volumetric gas flow to be fed to the burner nozzle can be reproduced to a high degree and is set with high accuracy. The gas flow and thus the burner heat output can be controlled continuously or in reproducible, defined steps. In this way, a direct, reproducible selection of defined burner heat outputs or burner-heat-output steps is made possible.

The desired burner heat output, i.e., the burner power, is preset by the user by means of a selector element on the cooking or baking appliance, and the corresponding flow is set by means of a control loop, which is essentially an iterative feedback loop. In addition, with the method according to the invention, it is possible, as in electrically operated cooking or baking appliances, to automatically control cooking or baking processes by means of a suitable control circuit, which presets the burner heat output to be set in each case.

The flow measurement or control, compared with the prior art pressure measurement or control described above, has the advantage that the gas volume consumed by the burner is detected directly, and not only a variable corresponding thereto, which leads to greater setting accuracy of the burner heat output. Furthermore, it is advantageous that, without an additional measure, the flow measurement, unlike the pressure measurement, detects whether a gas flow is present at all. In this way, the state of the nozzle and the gas feed line is monitored; a malfunction, e.g. clogging of the nozzle, is recognized in good time.

Compared with the above-described prior art disclosed by the German application DE 196 27 539 A1, pressure fluctuations in the gas feed line may also be compensated for by the method according to the invention. In addition, the method according to the invention can be carried out at a lower design cost.

In principle, any method which is suitable for accurately and reliably detecting the flow may be used within the scope of the method according to the invention.

In accordance with an added feature of the invention, the meter measures the gas flow by detecting a pressure difference occurring in the gas feed line. This method is based on the thermodynamic laws of flowing liquids, which can likewise be applied for flowing gases as long as the flow velocity remains clearly below the velocity of sound, i.e. the gases can be considered to be incompressible, which is the case in a gas-operated cooking or baking appliance. In a gas flow, there are two pressure types which are relevant in the present case: the static pressure acting transversely to the direction of flow and the dynamic pressure acting in the direction of flow, the sum of which (total pressure) is constant (Bernoulli's law). By means of a suitable measuring arrangement, the gas flow can be reliably measured for example, by an appropriate differential-pressure measurement in the flowing gas or by detection of a pressure difference between static and flowing gas.

In accordance with an additional feature of the invention, the meter measures the gas flow by detecting the cooling of a, preferably heatable, temperature sensor arranged in the gas feed line.

In accordance with another feature of the invention, the meter measures the gas flow by detecting the velocity of the gas flowing in the gas feed line.

In accordance with an advantageous feature of the invention, it is proposed that the controller control the gas flow as a function of the gas type and/or the burner type by being adapted to the respectively used gas type and/or the respectively used burner type. For the correct flow control, either a plurality of control data records are preset for the controller by the manufacturing plant, these control data records describing in each case the requisite flow as a function of the burner heat output for a gas type and/or a burner type, or a controller which calculates the desired flow values, corresponding to the desired burner heat outputs, as a function of the gas type and/or the burner type is used. With the preset or calculated desired flow value and the actual measured value, the controller determines controlled variables which are specific to the gas type or burner type and with which the actuating device is activated. In this way, with one burner nozzle, one controller and one actuating device, the flow can be controlled when using different gas types and/or burner types. The control behavior can thus be used for different burner types and/or gas types within a cooking or baking appliance or for different appliance types. The adaptation of the controller may be carried out manually or may be effected automatically by means of suitable sensors.

Ambient disturbance factors, for example air temperature, air humidity, air pressure, etc., may influence the thermodynamics of the combustion reaction of the gas, a factor which has an effect on the accuracy and reproducibility of the setting of the volumetric gas flow. In accordance with an advantageous development of the method according to the invention, it is therefore proposed that at least one ambient disturbance factor influencing the burner heat output be detected and taken into account during the control of the flow. In this way, the method also runs reliably in different climatic regions, during a change in the weather situation, etc. (i.e. during local or time-dependent changes in the environmental conditions).

With the above and other objects in view there is also provided, in accordance with the invention, a cooking or baking appliance, comprising:

a burner having a burner nozzle connected to a gas feed line;

a gas valve arranged in the gas feed line;

a control system including a meter connected to the gas feed line for detecting a current gas flow through the gas feed line, a controller for comparing the current gas flow with a predetermined setpoint gas flow value corresponding to a desired burner heat output and for determining a controlled variable; and an actuating device connected to the controller for receiving the controlled variable and for varying the gas flow through the gas feed line as a function of the controlled variable.

The cooking or baking appliance is, in particular, a gas stove, a gas cooker, a gas hob, or a gas oven, having a burner, the nozzle of which is connected to a gas feed line, a gas valve arranged in the gas feed line, and a control system, in particular for carrying out the method according to the invention. In this case, the control system has a meter connected to the gas feed line and detecting the current flow (actual measured value) of the gas through the gas feed line, a controller for comparing the actual measured value with a predetermined desired flow value corresponding to the desired burner heat output and for determining a controlled variable, and an actuating device for varying the gas flow through the gas feed line as a function of the controlled variable supplied.

By the provision of a flow-control system of uncomplicated design, the volumetric gas flow required for a desired burner heat output can be reproduced to a high degree and can be set with high accuracy.

In accordance with a preferred embodiment of the appliance according to the invention, the actuating device comprises the gas valve arranged in the gas feed line. In this way, the design cost of the control system is reduced.

Alternatively, the actuating device could also have a separate, variable flow resistance, which is arranged in the gas feed line and is provided in addition to the gas valve. The gas valve is preferably designed as a valve which can be opened or closed continuously or in predetermined steps, advantageously as a valve operated in an electromotive, electromagnetic or piezoelectric manner. Such valves work reliably and can be set very accurately.

In order to be able to alternatively operate the cooking or baking appliance with different gas types and/or different burner types, the control system preferably has a controller which can be adapted to the control of the flow in the case of different gas types and/or different burner types. So that the flow can be controlled as a function of the gas type or burner type, control data records for different gas types and/or burner types are preset for the controller by the manufacturing plant, or a controller type which calculates the requisite variables, in particular the desired flow value and controlled variable, as a function of the respective gas type and/or burner type is used.

An adaptable controller achieves the advantage that, if the gas type and/or burner type is changed, which may be necessary, for example, on account of a move, a trip (e.g. gas cooking appliance in a camper) or a change of use (use of a household appliance in a large kitchen), no labor-intensive exchange of the burner nozzle and/or of parts of the control system, e.g. controller and/or actuating device, by a trained service engineer or mechanic is necessary.

In an advantageous embodiment, requiring a low design cost, of the appliance according to the invention, the controller is adapted manually, for example by shifting a switch or setting a jumper, i.e. the control data record required for the gas type and burner type is preset for the controller. The adaptation may be carried out in the manufacturing plant, by a service engineer or by the user. In a preferred further embodiment of the appliance according to the invention, the control system has a gas sensor which detects the composition of the gas and can be brought into contact with the gas located in the gas feed line and/or a burner sensor which recognizes the burner type. The gas sensor is arranged, for example, in the gas feed line or a bypass. By means of the signals produced by the sensors and supplied to the controller, the controller finds the correct control data record or calculates the requisite variables. In this embodiment, the risk of an incorrect setting of the controller is reduced.

In order to be able to set the burner heat output in a reproducible and accurate manner even in the event of local or time-dependent changes in the environmental conditions (e.g. air temperature, humidity, pressure), the control system advantageously has a sensor with which an ambient disturbance factor influencing the burner heat output can be detected. A plurality of sensors may advantageously be provided in order to detect different disturbance factors. The disturbance factors detected are taken into account by the controller during the flow control, as a result of which greater accuracy and reproducibility of the heat-output setting is achieved.

Other features which are considered as characteristic for the invention are set forth in the appended claims.

Although the invention is illustrated and described herein as embodied in a control of the burner heat output in a gas-operated cooking or baking appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
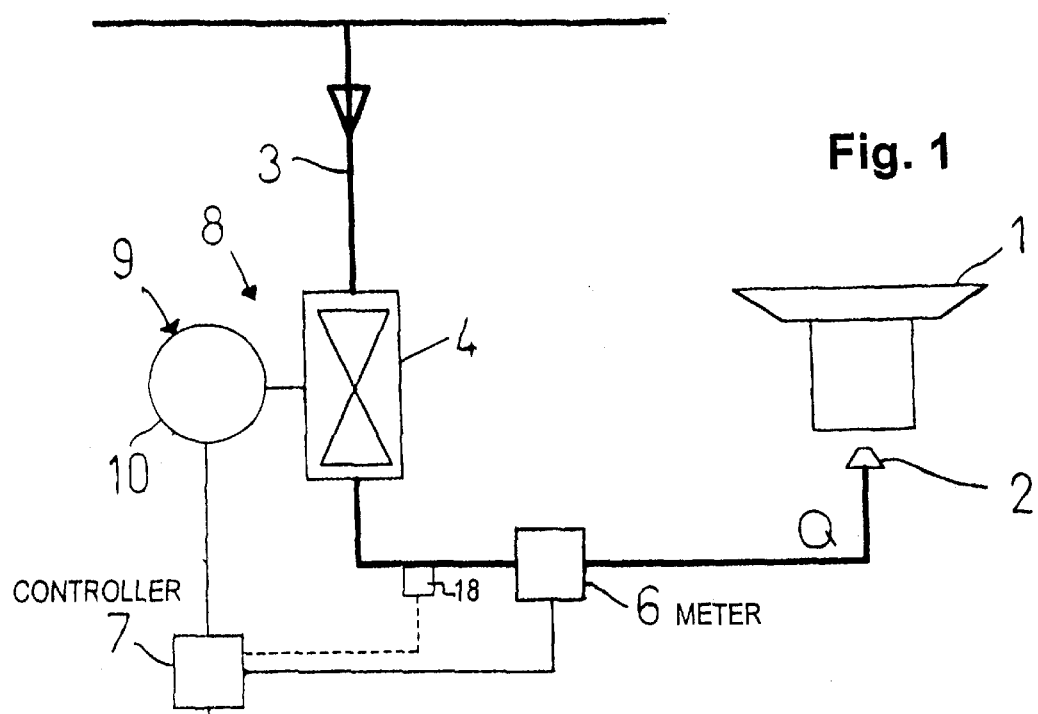
FIG. 1 is a diagrammatic sketch of an appliance according to the invention.

Referring now to the figures of the drawing in detail and first, particularly, to FIG. 1 thereof, there is seen a burner 1 which is fitted, for example, into a gas stove and a nozzle 2 of which is connected to a gas feed line 3, which is supplied from a gas-supply device. A gas valve 4 is arranged in the gas feed line 3 in order to vary a volumetric gas flow Q fed to the burner nozzle 2. A control system 5 can also be seen.

The control system 5 comprises a meter 6, which is connected to the gas feed line 3, detects the current flow (actual measured value) of the gas through the gas feed line 3 and has a suitable flow sensor for this purpose. In principle, any sensor with which a variable dependent upon the flow of the gas can be measured may serve as the flow sensor. The flow meter 6 is described in more detail further below with reference to FIGS. 2 to 6.

Furthermore, the control system 5 has a controller 7 for comparing the actual measured value with a predetermined desired flow value corresponding to the desired burner heat output and for determining a controlled variable. Within the scope of the invention, any controller which is suitable for regulating the gas flow with high accuracy to a desired flow value may be used. For example, a controller which has a microprocessor and a non-volatile memory (e.g. ROM, PROM or EPROM) may be used, a control data record, in which desired gas flow values corresponding to predetermined burner heat outputs are assigned, being stored in the memory; the control data record therefore describes the desired gas flow as a function of the burner heat output (control curve) for the gas type used and for the burner type connected to the gas feed line.

In addition, an actuating device 8 for varying the gas flow through the gas feed line 3 as a function of the controlled variable supplied is an integral part of the control system 5. The actuating device 8 comprises the electromotive gas valve 4 arranged in the gas feed line and an electric servomotor 10 as actuator 9. The latter is activated with the controlled variable by the controller 7 and opens or closes the gas valve 4 accordingly.

Desired burner heat outputs (reference variables) can be preset for the controller 7 by actuating a selector element 12 of the cooking or baking appliance, the selector element 12 forming the setpoint generator of the control system 5. In this case, the desired heat output may be selected in a conventional manner via an adjusting knob or via a control panel with step selection.

The conventional safety elements which interrupt the volumetric gas flow Q if the flame is extinguished are not shown.

The control system 5 may further include a sensor 18 which detects the type and/or quality of the gas transported in the gas feed line 3. The sensor 18 is connected to the controller 7. In addition, the control system 5 may also have a sensor for sensing the type of burner 1 and/or nozzle 2. This allows the control system and the controller 7 to regulate the system in dependence on the type of gas and/or the type of burner used in the appliance.

Various embodiments of a flow meter 6 are schematically shown in FIGS. 2 to 6.

Figure 2:
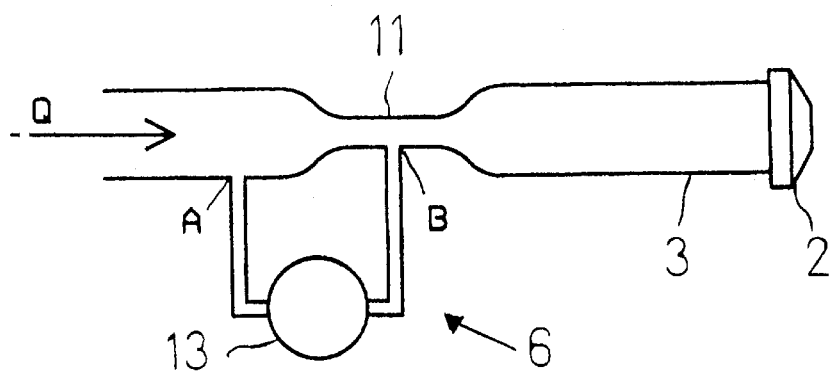
FIG. 2 is a schematic view of a first embodiment of a flow meter of the invention.
Figure 3:
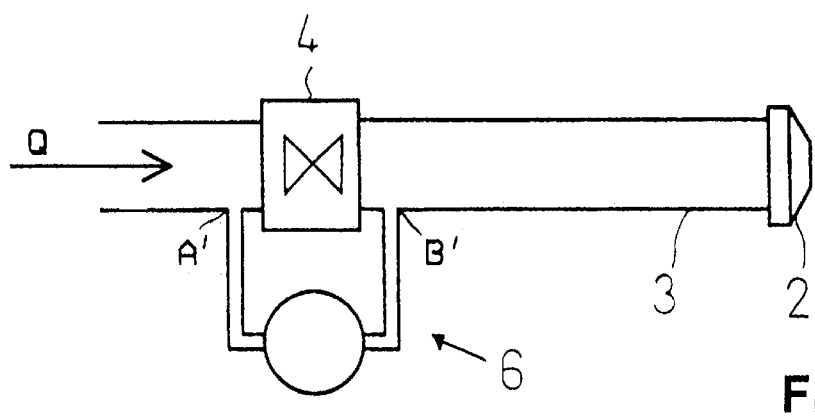
FIG. 3 is a schematic view of a second embodiment of the flow meter.
Figure 6:
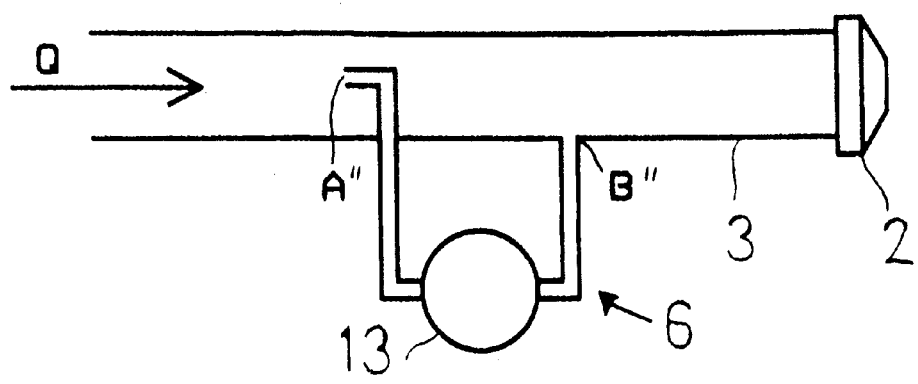
FIG. 6 is a schematic view of a fifth embodiment of the flow meter.

The meter 6 which can be seen in FIGS. 2, 3 and 6 is in each case designed in such a way that a flow-induced pressure difference in the gas feed line 3 can be detected. To this end, the gas feed line 3, in the embodiment which can be seen in FIG. 2, has a constriction 11 of the cross section of flow, that is, it is designed as a Venturi tube. The meter 6 has a differential-pressure sensor 13, which measures a difference in the static pressure between two measuring points A and B having different cross sections of flow. The constriction 11 of the cross section of flow may also be realized in another form, e.g. as a nozzle or orifice fitted in the gas feed line 3.

In the embodiment shown in FIG. 3, a total pressure with closed gas valve 4 is measured at the measuring point A'. In the case of a gas valve 4 opened in accordance with the setpoint input of the control loop, the static pressure is measured at the measuring point B'. The gas flow can be measured by detecting the difference—the difference corresponds to the dynamic pressure.

The embodiment in FIG. 6 shows a measurement system according to the dynamic-pressure principle (pitostatic tube). Here, a differential-pressure sensor 13 of the meter 6 detects the difference between the total pressure at the measuring point A" and the static pressure at the measuring point B", that is, the dynamic pressure. The gas flow can be measured by detecting the dynamic pressure. Further measuring arrangements known per se for measuring gas pressure differences may of course be used within the scope of the invention.

Figure 4:
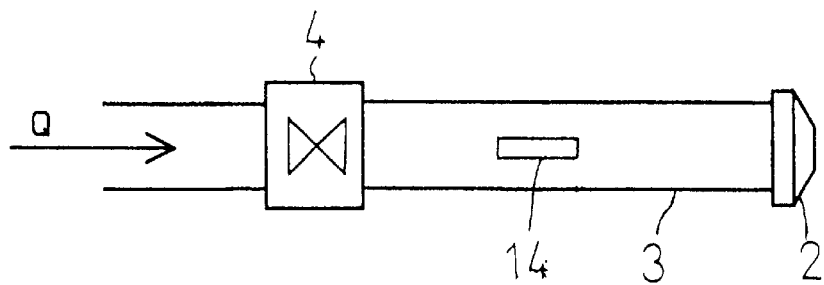
FIG. 4 is a schematic view of a third embodiment of the flow meter.

The meter 6 in FIG. 4 has a temperature sensor 14 arranged in the gas feed line 3, this temperature sensor 14 being, for example, a PTC thermistor element, the resistance of which changes as a function of its temperature. The temperature sensor 14 is heated by a non-illustrated heating unit. The greater the flow, the greater the cooling effect is on the temperature sensor 14 by the gas flowing over its surface. The cooling of the temperature sensor 14 and thus the gas flow are measured by detecting the sensor resistance. Alternatively, the heated temperature sensor 14 could be kept at a constant temperature by the heating unit, and the flow could be detected via the energy consumption required for this. The temperature sensor 14 may of course also be arranged in another manner, for example in a bypass of the gas feed line 3.

Figure 5:
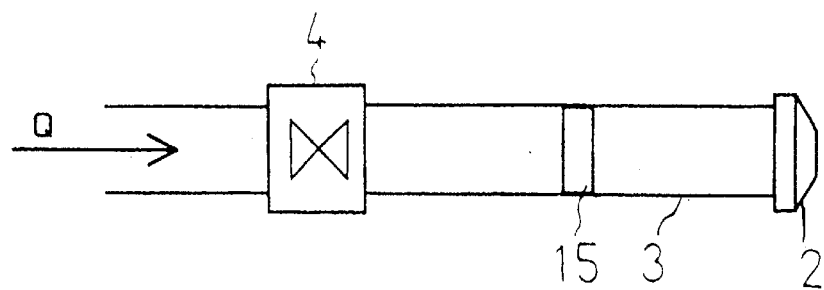
FIG. 5 is a schematic view of a fourth embodiment of the flow meter.

The meter 6 which can be seen in FIG. 5 has a velocity-measuring element 15 in the gas feed line 3. This velocity-measuring element 15 is, for example, a revolving vane, which is set in rotation by the flowing gas. The cross section of flow at the measuring point is known. The flow velocity and thus the flow are detected by measuring the rotational frequency. Alternatively, the velocity-measuring element 15 could be designed, for example, as flow lamellae, which are arranged transversely to the direction of flow and whose flow-induced, flow-dependent deflection is detected by the meter 6. The velocity-measuring element 15 may also be arranged in a bypass of the gas feed line 3 or may be arranged in another manner.

In addition to the embodiments described, other known flow-measuring arrangements, e.g. variable-area flow meter, gas volumetric meter, etc., may also be used within the scope of the invention.

Figure 7:
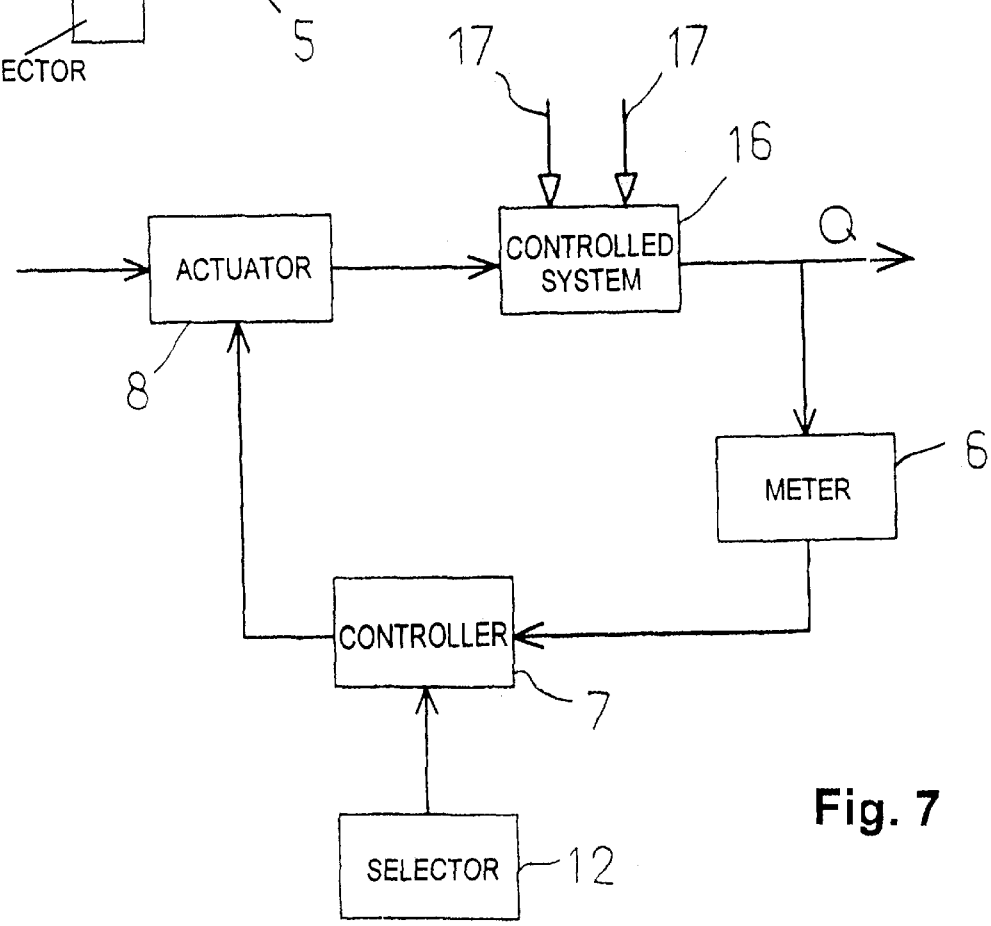
FIG. 7 is a block diagram of a control loop for the flow control according to the invention.

FIG. 7 describes the sequence of the method according to the invention. The flow (actual measured value) of the gas fed to the burner nozzle 2 at a certain position of the gas valve 4 of the actuating device 8 is measured by the meter 6 and converted into a corresponding electrical signal, which is supplied to the controller 7. Via the selector element 12, a desired flow value to be regulated, i.e. the desired burner heat output (reference variable), is preset for the controller 7. The controller 7 compares the actual measured value with the preset desired flow value. If the values deviate from one another, a controlled variable is formed from the deviation and fed to the servomotor 10 of the actuating device 8. The latter adjusts the gas valve 4 in accordance with the controlled variable, as a result of which the gas flow through the gas feed line 3 is changed.

Disturbance variables 17 (gas-pressure fluctuations, valve hysteresis, etc.), which are symbolized by arrows, act on the controlled system 16, which comprises the entire gas feed line 3 inside the cooking or baking appliance including the burner nozzle 2. These disturbance variables are detected during the flow measurement and are compensated for by the control loop. If, for example, the gas pressure in the gas feed line 3 drops or the burner nozzle 2 gradually becomes obstructed, a correspondingly lower gas flow is measured at a constant valve position, the result of which is that the gas valve 4 is opened correspondingly further via the control loop in order to set the desired flow value required for the desired burner heat output.

If the desired burner heat output is to be changed, a new desired flow value is preset for the controller 7 via the selector element 12 and the flow through the gas feed line 3 is regulated accordingly.

In the method, the functionality of the burner nozzle 2 is monitored at the same time. If the burner nozzle 2 has become obstructed, no flow can be measured, which can lead, for example, to an automatic shutdown of the cooking or baking appliance by means of a suitable circuit.

Due to the flow-control system, the volumetric gas flow Q required for the desired burner heat output can be reproduced to a high degree and set with high accuracy by means of known and commercially available components. As a result, an electronically controlled, gas-operated appliance with continuous selection of defined heat outputs or with selection of defined heat-output steps (e.g. steps from 0 to 9), to which the user of electrically operated cooking of baking appliances is accustomed, is created. Defined, reproducible gas/air mixtures are produced in the burner by the flow control. It is thus possible to set an ignitable gas/air mixture even with a non-maximum volumetric gas flow. The gas ignition is thereby improved.

We claim:

1. A method of setting a volumetric gas flow of a gas flowing through a gas feed line to a burner nozzle of a gas-operated cooking or baking appliance, which comprises:

measuring, with a meter, a current flow of a gas through a gas feed line to a burner nozzle;

regulating, with a controller and an actuating device, the gas flow to a calculated or preset setpoint flow value and thereby adjusting a burner heat output to a desired burner heat output; and adapting the controller to one of a gas type and a burner type and controlling the gas flow as a function of one of the gas type and the burner type.

2. The method according to claim 1, wherein the measuring step comprises detecting with the meter a pressure difference in the gas feed line.

3. The method according to claim 1, wherein the measuring step comprises detecting with the meter a cooling of a temperature sensor arranged in the gas feed line.

4. The method according to claim 3, wherein the temperature sensor is a heatable sensor.

5. The method according to claim 1, wherein the measuring step comprises detecting with the meter a velocity of the gas flowing in the gas feed line.

6. The method according to claim 1, which comprises detecting at least one ambient disturbance factor influencing the burner heat output and taking the ambient disturbance factor into account during the control of the flow.

7. A cooking or baking appliance, comprising:

a burner having a burner nozzle connected to a gas feed line having a constriction of a flow cross section and measuring points;

a gas valve arranged in said gas feed line;

a control system including:

a meter connected to said gas feed line for detecting a current gas flow through said gas feed line, said meter adapted to detect a flow-induced pressure difference in said gas feed line and having a differential-pressure sensor for measuring a difference in a static pressure between said measuring points, each of said measuring points defining a different flow cross section of said gas feed line; and a controller for comparing the current gas flow with a predetermined setpoint gas flow value corresponding to a desired burner heat output and for determining a controlled variable; and an actuating device connected to said controller for receiving the controlled variable and for varying the gas flow through said gas feed line as a function of the controlled variable.

8. The appliance according to claim 7, wherein said actuating device comprises the gas valve.

9. The appliance according to claim 7, wherein said gas valve is a continuously adjustable valve.

10. The appliance according to claim 7, wherein said gas valve is adjustable in discrete steps.

11. The appliance according to claim 7, wherein said gas valve is a valve selected from the group consisting of electromotive, electromagnetic, and piezoelectric valve.

12. A cooking or baking appliance, comprising:

a burner having a burner nozzle connected to a gas feed line;

a gas valve arranged in said gas feed line;

a control system including a meter connected to said gas feed line for detecting a current gas flow through said gas feed line, and a controller for comparing the current gas flow with a predetermined setpoint gas flow value corresponding to a desired burner heat output and for determining a controlled variable, said controller adaptable to control a flow of gas for different types of gas and for different types of burners; and an actuating device connected to said controller for receiving the controlled variable and for varying the gas flow through said gas feed line as a function of the controlled variable.

13. The appliance according to claim 12, wherein said control system includes a gas sensor to be brought into contact with the gas in the gas feed line for detecting a composition of the gas.

14. The appliance according to claim 7, wherein said control system includes a sensor for detecting an ambient disturbance factor influencing the burner heat output.

15. The appliance according to claim 12, wherein said meter includes a temperature sensor.

16. The appliance according to claim 12, wherein said meter includes a heatable temperature sensor.

17. The appliance according to claim 12, wherein said meter includes a velocity-measuring element.

* * * * *